US012656583B2

(12) United States Patent
Moon et al.

(10) Patent No.: US 12,656,583 B2
(45) Date of Patent: Jun. 16, 2026

(54) ELECTRONIC DEVICE INCLUDING LENS-INTEGRATED WINDOW MEMBER

(71) Applicant: SAMSUNG ELECTRONICS CO., LTD., Suwon-si (KR)

(72) Inventors: Youngmin Moon, Suwon-si (KR); Sangung An, Suwon-si (KR); Hosoon Lee, Suwon-si (KR); Jaehyun Bae, Suwon-si (KR); Kyunghoon Lim, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 18/320,506

(22) Filed: May 19, 2023

(65) Prior Publication Data

US 2023/0288676 A1 Sep. 14, 2023

Related U.S. Application Data

(63) Continuation of application No. PCT/KR2021/015205, filed on Oct. 27, 2021.

(30) Foreign Application Priority Data

Nov. 20, 2020 (KR) ........................ 10-2020-0156865

(51) Int. Cl.
| | |
|---|---|
| *G02B 13/00* | (2006.01) |
| *G02B 7/02* | (2021.01) |
| *H04M 1/02* | (2006.01) |

(52) U.S. Cl.
CPC ......... *G02B 13/0055* (2013.01); *G02B 7/021* (2013.01); *H04M 1/026* (2013.01)

(58) Field of Classification Search
CPC ........ G03B 17/12; G03B 30/00; H04N 23/55; H04M 1/0264; H04M 1/026;
(Continued)

(56) References Cited

U.S. PATENT DOCUMENTS

| | | | |
|---|---|---|---|
| 9,591,111 B1 | 3/2017 | Holmes et al. | |
| 10,018,891 B2 | 7/2018 | Weber | |
(Continued)

FOREIGN PATENT DOCUMENTS

| | | | |
|---|---|---|---|
| JP | 2008510248 A | 4/2008 | |
| JP | 2013109011 A | 6/2013 | |
(Continued)

OTHER PUBLICATIONS

Original and Translation of WO 2021107710 A1 (Year: 2021).*
(Continued)

*Primary Examiner* — Thomas K Pham
*Assistant Examiner* — Ruby L Kauffman
(74) *Attorney, Agent, or Firm* — Nixon & Vanderhye, P.C.

(57) ABSTRACT

An example electronic device includes a window including a first surface and a second surface that faces the direction opposite to that of the first surface; a lens housing disposed in the internal space of the electronic device; and an optical lens module including a lens assembly aligned toward the second surface of the window in the lens housing, wherein the window includes: a window lens area formed on the first surface or the second surface; and an alignment guide formed on the perimeter of the window lens area for aligning the window lens area and the lens assembly.

13 Claims, 13 Drawing Sheets

(58) Field of Classification Search
CPC . H04M 1/0266; G02B 13/0055; G02B 7/021; G02B 1/11; G02B 7/02; G02B 13/00; G02B 13/0015; G06F 3/041
See application file for complete search history.

(56) References Cited

U.S. PATENT DOCUMENTS

| | | | |
|---|---|---|---|
| 11,178,320 B2 * | 11/2021 | Noh .................... | H04M 1/0266 |
| 2002/0093024 A1 | 7/2002 | Lee et al. | |
| 2013/0088845 A1 | 4/2013 | Rudmann et al. | |
| 2013/0128092 A1 | 5/2013 | Ogasahara et al. | |
| 2013/0215323 A1 | 8/2013 | Kim et al. | |
| 2014/0240856 A1 | 8/2014 | Allore et al. | |
| 2016/0124290 A1 | 5/2016 | Bergreen et al. | |
| 2017/0149939 A1 | 5/2017 | Wang et al. | |
| 2020/0267293 A1 | 8/2020 | Noh et al. | |
| 2020/0304616 A1 | 9/2020 | Jones | |
| 2020/0366818 A1 | 11/2020 | Jia | |

FOREIGN PATENT DOCUMENTS

| | | | | | |
|---|---|---|---|---|---|
| JP | 3187167 U9 | 11/2013 | | | |
| KR | 19950027459 A | 10/1995 | | | |
| KR | 20020031002 A | 4/2002 | | | |
| KR | 20060034584 A | 4/2006 | | | |
| KR | 20110043350 A | 4/2011 | | | |
| KR | 20130019695 A | 2/2013 | | | |
| KR | 20130094500 A | 8/2013 | | | |
| KR | 20140024752 A | 3/2014 | | | |
| KR | 101626842 B1 | 6/2016 | | | |
| KR | 20190010305 A | 1/2019 | | | |
| KR | 20190072017 A | 6/2019 | | | |
| KR | 10-2020-0101039 | 8/2020 | | | |
| KR | 102632916 B1 * | 2/2024 | ............. | H04N 23/55 |
| WO | WO-2021107710 A1 * | 6/2021 | .......... | H04M 1/0264 |

OTHER PUBLICATIONS

International Search Report for PCT/KR/2021/015205, mailed Jan. 28, 2022, 5 pages.
Written Opinion of the ISA for PCT/KR2021/015205, mailed Jan. 28, 2022, 4 pages.
Office Action dated Mar. 28, 2025 in Korean Patent Application No. 10-2020-0156865 and English-language translation.

* cited by examiner

ELECTRONIC DEVICE INCLUDING LENS-INTEGRATED WINDOW MEMBER

CROSS-REFERENCE TO RELATED APPLICATIONS

This application is a continuation of International Patent Application No. PCT/KR2021/015205 designating the United States, filed on Oct. 27, 2021, in the Korean Intellectual Property Receiving Office and claiming priority to Korean Patent Application No. 10-2020-0156865, filed on Nov. 20, 2020, in the Korean Intellectual Property Office, the disclosures of which are incorporated by reference herein in their entireties.

BACKGROUND

Field

The disclosure relates to an electronic device including a lens-integrated window member.

Description of Related Art

"Electronic device" may, for example, refer to a device performing a particular function according to its equipped program, such as a home appliance, an electronic scheduler, a portable multimedia player, a mobile communication terminal, a tablet PC, a video/sound device, a desktop PC or laptop computer, a navigation system for automobile, and the like. For example, electronic devices may output stored information as voices or images. As electronic devices are highly integrated, and high-speed, high-volume wireless communication becomes commonplace, an electronic device, such as a mobile communication terminal, are becoming equipped with various functions. For example, an electronic device may come with integrated functionality, including an entertainment function, such as playing video games, a multimedia function, such as replaying music/ videos, a communication and security function for mobile banking, and a scheduling or e-wallet function. Such electronic devices have become sufficiently compact for users to carry in a convenient way.

Meanwhile, optical lens modules (or optical devices), e.g., cameras capable of capturing images or videos are widely used. Conventional film-type optical lens-modules are being replaced with digital cameras or video cameras with a solid-state image sensor, such as a charge coupled device (CCD) or a complementary metal-oxide semiconductor (CMOS) because solid-state image sensor (CCD or CMOS)-adopted optical lens modules may easily save, copy, or move images as compared with film-type optical lens modules. To obtain high-quality images and/or videos, an optical lens module may include a plurality of lenses. An optical module (e.g., lens assembly), a combination of multiple lenses, has a lower F-number and smaller aberration and thus enables obtaining higher-quality (higher-resolution) images and/or videos. Obtaining a lower F number and smaller aberration, e.g., a higher resolution and brighter images, may call for multiple lenses. Optical lens modules have typically been used for electronic devices specified for image capturing, as are digital cameras, but are being equipped in compact electronic devices such as portable wireless terminals. The above-described optical lens modules are nowadays taking their position as an essential component of electronic devices which provide various services and additional functions, and high-performance optical lens modules may be effective in leading to purchase of electronic devices.

SUMMARY

While electronic devices have tended to be downsized for user convenience, the optical lens modules equipped in the electronic devices are becoming high-spec. As these optical lens modules become more and more high-spec, they may include more lenses. As the number of the lenses increases, at least a portion of the optical lens module may be shaped to protrude from the exterior of the electronic device. As such, if at least a portion of the optical lens module protrudes outward of the electronic device, the appearance of the electronic device may deteriorate.

Further, in a case in which an optical lens module is installed on a front surface of the electronic device to take a selfie of the user, the optical lens module should be designed not to protrude outward of the electronic device due to the display area provided on the front surface of the electronic device. Thus, it may be difficult to increase the specifications of the optical lens module by increasing the number of lenses.

Embodiments of the disclosure provide an electronic device having an elegant exterior while maintaining high specifications of an optical lens module by integrating a lens to the window member.

According to an example embodiment of the disclosure, an electronic device may include a window (e.g., a window member) including a first surface and a second surface facing in a direction opposite to the first surface and an optical lens module including a lens housing disposed in an internal space of the electronic device and a lens assembly aligned to the second surface of the window in the lens housing, wherein the window includes a window lens area formed in a position corresponding to the lens assembly in the first surface or the second surface and an alignment guide formed around the window lens for aligning the window lens area and the lens assembly.

According to an example embodiment of the disclosure, an electronic device may include a window (e.g., window member) including a first surface forming a front surface of the electronic device and a second surface facing in a direction opposite to the first surface, a display panel stacked with the window, and an optical lens module including a lens housing disposed in an internal space of the electronic device and a lens assembly aligned to the second surface of the window in the lens housing, wherein the window includes a window lens area formed on the first surface or the second surface and an alignment guide formed around the window lens for aligning the window lens area and the lens assembly, and wherein the window lens area and the alignment guide are integrally formed with the window.

According to various example embodiments of the disclosure, an electronic device may be provided with an elegant or aesthetically-pleasing exterior by preventing (or reducing) the optical lens module from exposure to the outside of the electronic device while securing a lens performance of the optical lens module by forming the lens in the window protecting the components inside the electronic device and visually exposing at least a portion of the display.

According to various example embodiments of the disclosure, the number of lenses in the lens assembly of the optical lens module may be reduced due to the lens being formed in a partial area of the window, thus reducing the thickness of the electronic device or increasing the number of lenses that can be included in the optical lens module.

According to various example embodiments of the disclosure, misalignment (decenter) between the window lens and the optical lens module can be prevented or reduced by adding a guide member to the window.

According to various example embodiments of the disclosure, light loss due to the refractive index of the medium of the window may be reduced by forming an anti-reflection coating layer on the window.

According to various example embodiments of the disclosure, a lens-related accessory may be coupled by providing a guide portion for accessory assembly to the window.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Embodiments of the disclosure are provided to thoroughly explain the disclosure to those skilled in the art, and various modifications may be made thereto, and the scope of the present disclosure is not limited thereto. Embodiments of the disclosure are provided to fully and thoroughly convey the spirit of the disclosure to those skilled in the art.

As used herein, the thickness and size of each layer may be exaggerated or shrunken for ease or clarity of description. The same reference denotations may be used to refer to the same or substantially the same elements throughout the specification and the drawings. As used herein, the term "A and/or B" encompasses any, or one or more combinations, of A and B.

Figure 1:
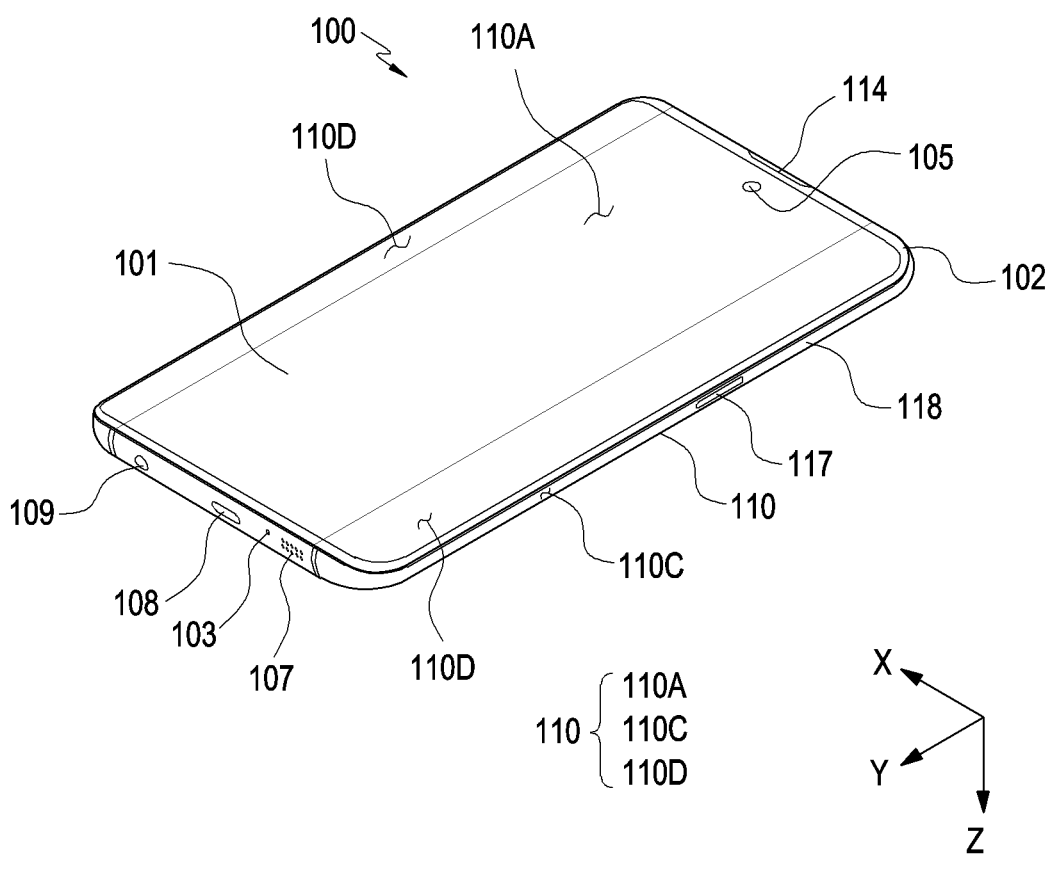
FIG. 1 is a diagram illustrating a front perspective view of an electronic device according to various embodiments.
Figure 2:
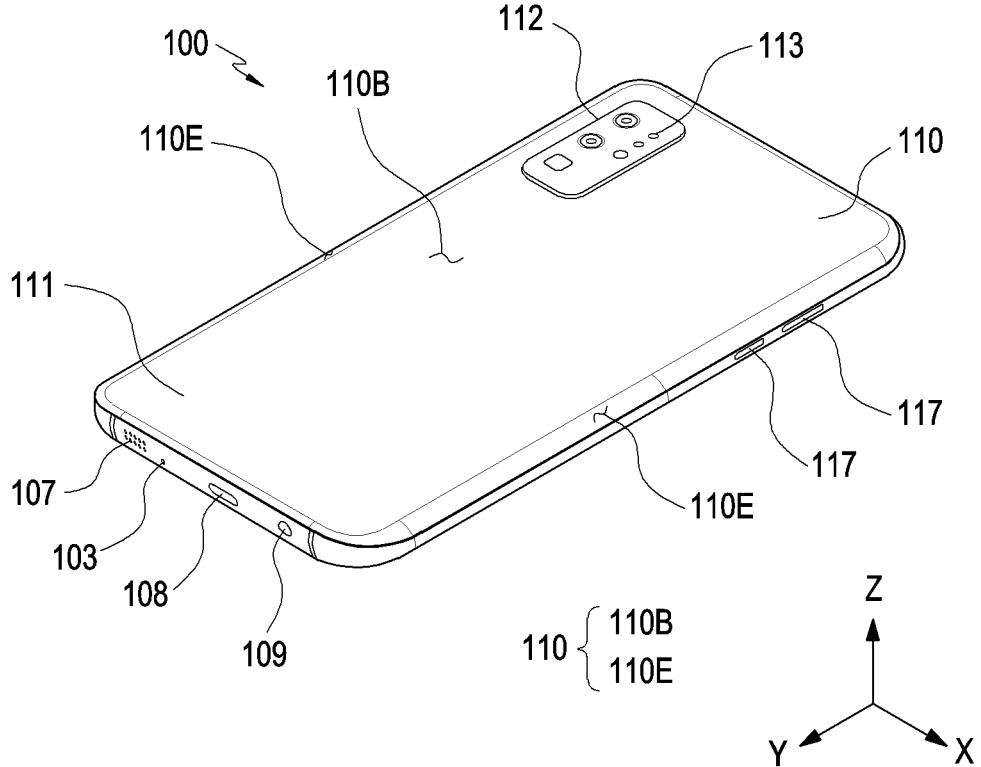
FIG. 2 is a diagram illustrating a rear perspective view of an electronic device according to various embodiments.

FIG. 1 is a diagram illustrating a front perspective view of an electronic device 100 according to various embodiments. FIG. 2 is a diagram illustrating a rear perspective view of an electronic device 100 according to various embodiments.

Referring to FIGS. 1 and 2, according to an embodiment, an electronic device 100 may include a housing 110 with a front surface 110A, a rear surface 110B, and a side surface 110C surrounding a space between the front surface 110A and the rear surface 110B. According to an embodiment (not shown), the housing 110 may, for example, denote a structure forming part of the front surface 110A, and the side surfaces 110C of FIG. 1, the rear surface 110B of FIG. 2. According to an embodiment, at least part of the front surface 110A may have a substantially transparent front plate 102 (e.g., a glass plate or polymer plate including various coating layers). The rear surface 110B may be formed by a rear plate 111. The rear plate 111 may be formed of, e.g., glass, ceramic, polymer, metal (e.g., aluminum, stainless steel (STS), or magnesium), or a combination of at least two thereof. The side surface 110C may be formed by a side bezel structure (or a "side member") 118 that couples to the front plate 102 and the rear plate 111 and includes a metal and/or polymer. According to an embodiment, the rear plate 111 and the side bezel plate 118 may be integrally formed together and include the same material (e.g., glass, metal, such as aluminum, or ceramic).

In the embodiment illustrated, the front plate 102 may include two first edge areas 110D, which seamlessly and bendingly extend from the first surface 110A toward the rear plate 111, on both the long edges of the front plate 102. In the embodiment (see FIG. 2) illustrated, the rear plate 111 may include two second edge areas 110E, which seamlessly and bendingly extend from the rear surface 110B toward the front plate 102, on both the long edges. According to an embodiment, the front plate 102 (or the rear plate 111) may include only one of the first edge areas 110D (or the second edge areas 110E). Alternatively, the first edge areas 110D or the second edge areas 110E may partially be excluded. According to an embodiment, in a side view of the electronic device 100, the side bezel structure 118 may have a first thickness (or width) for sides that do not have the first edge areas 110D or the second edge areas 110E and a second thickness, which is smaller than the first thickness, for sides that have the first edge areas 110D or the second edge areas 110E.

According to an embodiment, the electronic device 100 may include at least one or more of a display panel 101, audio modules 103, 107, and 114, sensor modules, camera modules 105, 112, and 113, key input devices 117, and connector holes 108 and 109. According to an embodiment, the electronic device 100 may not include at least one (e.g., the connector hole 109) of the components or may include other components (not shown).

According to an embodiment, the display panel 101 may be visually revealed through, e.g., a majority portion of the front plate 102. According to an embodiment, at least a portion of the display panel 101 may be exposed through the front plate 102 forming the front surface 110A and the first edge areas 110D. According to an embodiment, the edge of the display panel 101 may be formed to be substantially the same in shape as an adjacent outer edge of the front plate 102. According to an embodiment (not shown), the interval between the outer edge of the display panel 101 and the outer edge of the front plate 102 may remain substantially even to give a larger area of exposure the display panel 101.

According to an embodiment, the surface (or the front plate 102) of the housing 110 may include a screen display area formed as the display panel 101 is visually exposed. For example, the screen display area may include the front surface 110A and first edge areas 110D.

According to an embodiment (not shown), a recess or opening may be formed in a portion of the screen display area (e.g., the front surface 110A or the first edge area 110D) of the display panel 101, and at least one or more of the audio module 114, sensor module (not shown), light emitting device (not shown), and camera module 105 may be aligned with the recess or opening. According to an embodiment (not shown), at least one or more of the audio module 114, sensor module (not shown), camera module 105, fingerprint sensor (not shown), and light emitting device (not shown) may be included on the rear surface of the screen display area of the display panel 101.

According to an embodiment (not shown), the display panel 101 may be disposed to be coupled with, or adjacent, a touch detecting circuit, a pressure sensor capable of measuring the strength (pressure) of touches, and/or a digitizer for detecting a magnetic field-type stylus pen.

According to an embodiment, at least part of the key input device 117 may be disposed in the first edge areas 110D and/or the second edge areas 110E.

According to an embodiment, the audio modules 103, 107, and 114 may include, e.g., a microphone hole 103 and speaker holes 107 and 114. A microphone for acquiring external sounds may be disposed in the microphone hole 103. In various embodiments, a plurality of microphones may be disposed to detect the direction of the sound. The speaker holes 107 and 114 may include an external speaker hole 107 and a phone receiver hole 114. In various embodiments, the speaker holes 107 and 114 and the microphone hole 103 may be implemented as a single hole, or a speaker may be included without the speaker holes 107 and 114 (e.g., a piezo speaker). The audio modules 103, 107, and 114 are not limited to the above-described structure. Depending on the structure of the electronic device 100, various design changes may be made—e.g., only some of the audio modules may be mounted, or a new audio module may be added.

According to an embodiment, the sensor modules (not shown) may generate an electrical signal or data value corresponding to an internal operating state or external environmental state of the electronic device 100. The sensor modules (not shown) may include a first sensor module (not shown) (e.g., a proximity sensor) and/or a second sensor module (not shown) (e.g., a fingerprint sensor) disposed on the front surface 110A of the housing 110 and/or a third sensor module (not shown) (e.g., a heart rate monitor (HRM) sensor) and/or a fourth sensor module (not shown) (e.g., a fingerprint sensor) disposed on the rear surface 110B of the housing 110. In an embodiment (not shown), the fingerprint sensor may be disposed on the rear surface 110B as well as on the front surface 110A (e.g., the display panel 101) of the housing 110. The electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown). The sensor module (not shown) is not limited to the above-described structure. Depending on the structure of the electronic device 100, various design changes may be made—e.g., only some of the sensor modules may be mounted, or a new sensor module may be added.

According to an embodiment, the camera modules 105, 112, and 113 may include a first camera module 105 disposed on the first surface 110A of the electronic device 100, and a rear camera module 112 and/or a flash 113 disposed on the rear surface 110B. The camera modules 105 and 112 may include one or more lenses, an image sensor, and/or an image signal processor. The flash 113 may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 100. The camera modules 105, 112, and 113 are not limited to the above-described structure. Depending on the structure of the electronic device 100, various design changes may be made—e.g., only some of the camera modules may be mounted, or a new camera module may be added.

According to an embodiment, the electronic device 100 may include a plurality of camera modules (e.g., a dual camera or triple camera) having different attributes (e.g., angle of view) or functions. For example, a plurality of camera modules 105 and 112 including lenses having different angles of view may be configured, and the electronic device 100 may control to change the angle of view of the camera modules 105 and 112 performed by the electronic device 100 based on the user's selection. At least one of the plurality of camera modules 105 and 112 may provide, for example, a wide-angle camera and at least another of the plurality of camera modules may provide a telephoto camera. Similarly, at least one of the plurality of camera modules

105 and 112 may be a front camera and at least another of the plurality of camera modules may be a rear camera. Further, the plurality of camera modules 105 and 112 may include at least one of a wide-angle camera, a telephoto camera, and an infrared (IR) camera (e.g., a time of flight (TOF) camera, a structured light camera). According to an embodiment, the IR camera may be operated as at least a portion of the sensor module. For example, the TOF camera may be operated as at least a portion of a sensor module (not shown) for detecting the distance to the subject.

According to an embodiment, the key input device 117 may be disposed on the side surface 110C of the housing 110. According to an embodiment, the electronic device 100 may omit all or some of the above-mentioned key input devices 117 and the omitted key input devices 117 may be implemented in other forms, e.g., as soft keys, on the display panel 101. According to an embodiment, the key input device may include the sensor module (not shown) disposed on the rear surface 110B of the housing 110.

According to an embodiment, a light emitting device may be disposed on, e.g., the front surface 110A of the housing 110. The light emitting device (not shown) may provide, e.g., information about the state of the electronic device 100 in the form of light. According to an embodiment, the light emitting device (not shown) may provide a light source that interacts with, e.g., the front camera module 105. The light emitting device (not shown) may include, e.g., a light emitting diode (LED), an infrared (IR) LED, and/or a xenon lamp.

According to an embodiment, the connector holes 108 and 109 may include, e.g., a first connector hole 108 for receiving a connector (e.g., a universal serial bus (USB) connector) for transmitting or receiving power and/or data to/from an external electronic device and/or a second connector hole (e.g., an earphone jack) 109 for receiving a connector for transmitting or receiving audio signals to/from the external electronic device. The connector holes 108 and 109 are not limited to the above-described structure. Depending on the structure of the electronic device 100, various design changes may be made, such as including only some of the connector holes or adding a new connector hole.

FIG. 1 and the subsequent figures illustrate a spatial coordinate system defined by an X-axis, a Y-axis and a Z-axis orthogonal to each other. Here, the X axis may, for example, refer to a width direction of the electronic device 100, the Y axis may, for example, refer to a length direction of the electronic device 100, and the Z axis may, for example, refer to a height (thickness) direction of the electronic device 100.

According to various embodiments of the disclosure, the electronic device may have a bar-type or plate-type appearance, but the disclosure is not limited in this respect. For example, the illustrated electronic device may be part of a rollable electronic device, a slidable electronic device, or a foldable electronic device.

An electronic device having an elegant or aesthetically-pleasing exterior, while maintaining high specifications of an optical lens module by integrating a lens to a window member, according to various embodiments of the disclosure, is described below through FIGS. 3 to 10B.

In the following description, the front plate 102 may be referred to as 'window member 102', and the camera modules 105, 112, and 113 may be referred to as 'optical lens modules 105'. The front camera module 105 of FIG. 1 is primarily described as the optical lens module 105 for convenience of description, but it should be noted that the description may also apply to the rear camera modules 112 and 113.

Figure 3:
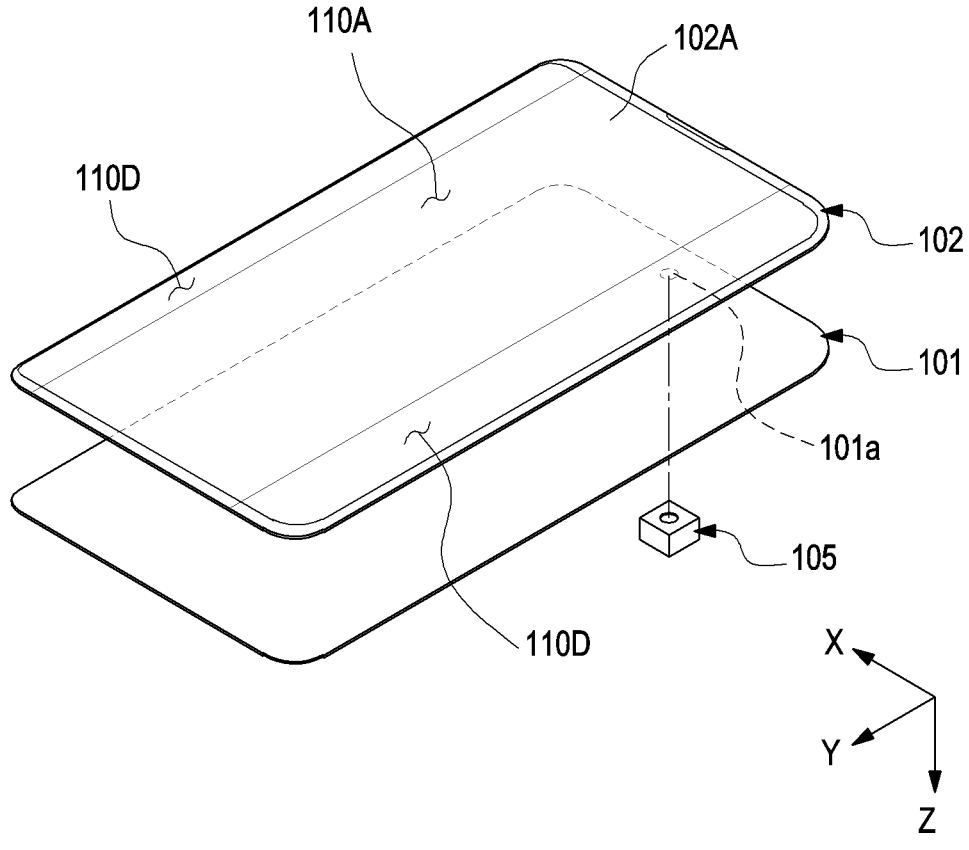
FIG. 3 is a diagram illustrating an exploded perspective view of a window member, a display, and an optical lens module according to various embodiments.

FIG. 3 is a diagram illustrating an exploded perspective view of a window member 102, a display panel 101, and an optical lens module 105 according to various embodiments.

According to an example embodiment, at least a portion of the window member 102 may be formed of a substantially transparent material. For example, the front plate may be formed of a glass plate or polymer plate with various coat layers. According to an embodiment, the display panel 101 may be exposed through a significant portion of the window member 102 so that the screen displayed on the display may be viewed from the outside.

According to various embodiments, a polarization layer (not shown) may be further included between the window member 102 and the display panel 101. The polarization layer (not shown) may allow for transmission of only a specific wavelength of light of the light incident on the display panel 101 or the screen displayed on the display panel 101.

According to an embodiment, the optical lens module 105 and/or the sensor module (not shown) may be exposed to the external environment through a designated area of the window member 102 and the display panel 101 and may be disposed in the internal space of the electronic device 100. For example, the designated area may be an area in which pixels are not disposed in the display panel 101. As another example, the designated area may be an area in which pixels are disposed in the display panel 101. When viewed from above the display panel 101, at least a portion of the designated area may overlap the optical lens module 105 and/or the sensor module. As another example, some sensor modules may be arranged to perform their functions without being visually exposed through the window member 102 from the internal space of the electronic device.

Referring to FIG. 3, the window member 102 may include a first surface 102A forming the front surface 110A of the housing (e.g., the housing 110 of FIG. 1) and a second surface 102B (see FIG. 4) facing in a direction (e.g., a parallel with the Z axis) opposite to the first surface 102A. The first surface 102A may include two first edge areas 110D bent and seamlessly extending from the front surface 110A toward the rear plate (e.g., the rear plate 111 of FIG. 2) of the electronic device 100, as well as the front surface 110A of the housing 110.

According to an embodiment, the display panel 101 may include an opening 101a. According to an embodiment, the opening 101a may be an area in which no pixel is disposed. The opening 101a may have a predetermined diameter and be formed in a position corresponding to the lens assembly included in the optical lens module 105. According to an embodiment, when the electronic device 100 is later manufactured, the opening 101a provided in the display panel 101 may be aligned along the optical axis with the lens assembly of the optical lens module 105 in the processes of assembling individual components.

Figure 4:
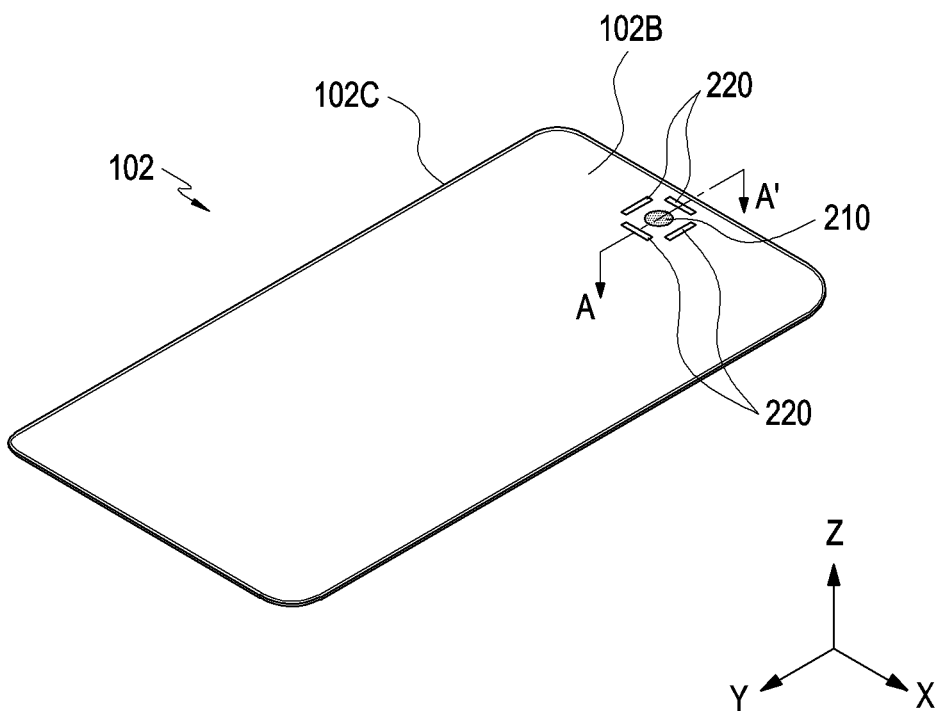
FIG. 4 is a diagram illustrating rear perspective view of a window member according to various embodiments.
Figure 5:
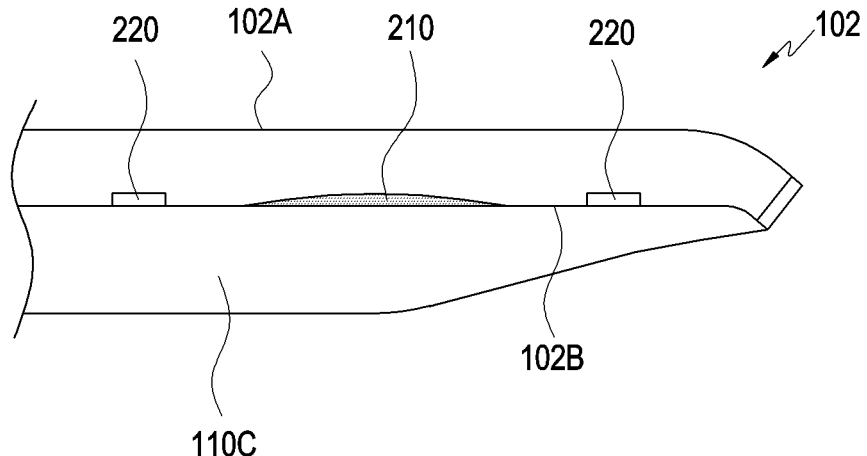
FIG. 5 is a diagram illustrating a cross-sectional view of a window member according to various embodiments.

FIG. 4 is a diagram illustrating a rear perspective view of a window member 102 according to various embodiments. FIG. 5 is a diagram illustrating a cross-sectional view of a window member 102 according to various embodiments. FIG. 5 corresponds to a cross section taken along A-A' of the window member 102 of FIG. 4.

According to various embodiments, a window member 102 may include a window lens area 210 formed on a first surface 102A or a second surface 102B. Further, the window member 102 may include a guide member 220 for aligning the window lens area 210 and the lens assembly of the optical lens module (e.g., the optical lens module 105 of FIG. 3).

FIG. 4 illustrates that the window lens area 210 is formed in the second surface 102B of the window member 102. The window lens area 210 may be provided to have a lens shape with a predetermined diameter and be formed in a position corresponding to the lens assembly included in the optical lens module (e.g., the optical lens module 105 of FIG. 3).

The guide member 220 may be formed around the window lens area 210. A plurality of guide members 220 may be provided around the window lens area 210. The positions and number of the guide members 220 are not limited to any specific position and number. FIG. 4 illustrates that four guide members 220 are radially arranged around the window lens area 210, and the four guide members 220 are symmetrically arranged with respect to the window lens area 210. However, without limitations thereto, it should be noted that fewer or more guide members 220 may be provided in various positions for aligning the window lens area 210 and the lens assembly of the optical lens module (e.g., the optical lens module 105 of FIG. 3).

FIG. 5 illustrates that the window lens area 210 and the guide member 220 are integrally formed with the window member 102. In other words, the window lens area 210 and the guide member 220 may be formed of the same material (e.g., glass) as the window member 102.

According to various embodiments, the window lens area 210 may be provided in a concave lens shape, which is concave from the first surface 102A or the second surface 102B of the window member 102, or in a convex lens shape which is convex from the first surface 102A or the second surface 102B of the window member 102. In describing the shape of a lens, 'one surface of the lens is convex' may refer, for example, to the optical axis portion of the surface being convex, and 'one surface of the lens is concave' may refer, for example, to the optical axis portion of the surface being concave. Thus, although one surface of the lens area is described as having a convex shape, the edge of the lens area may be concave. Likewise, although one surface of the lens area is described as having a concave shape, the edge of the lens area may be convex. Further, in the following detailed description, the term 'inflection point' may refer, for example, to a point where the radius of curvature changes in a portion which does not cross the optical axis. FIG. 5 illustrates that the window lens area 210 has a concave lens shape concave from the second surface 102B of the window member 102, but the disclosure is not limited thereto.

According to various embodiments, the guide member 220 may be shaped to be led in to the inside from the second surface 102B of the window member 102 or to project from the second surface 102B by a predetermined height. FIG. 5 illustrates that the guide member 220 is shaped to be led in to the inside from the second surface 102B of the window member 102, but the disclosure is not limited thereto.

Figure 6A:
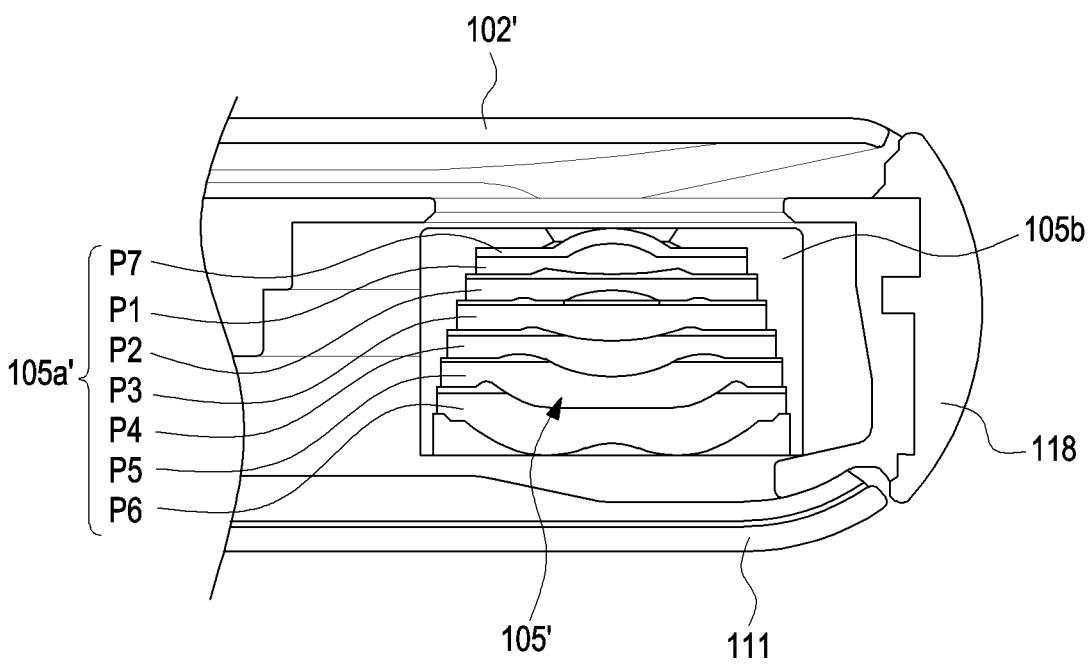
FIG. 6A is a diagram illustrating cross-sectional view of an electronic device including a window member and an optical lens module.
Figure 6B:
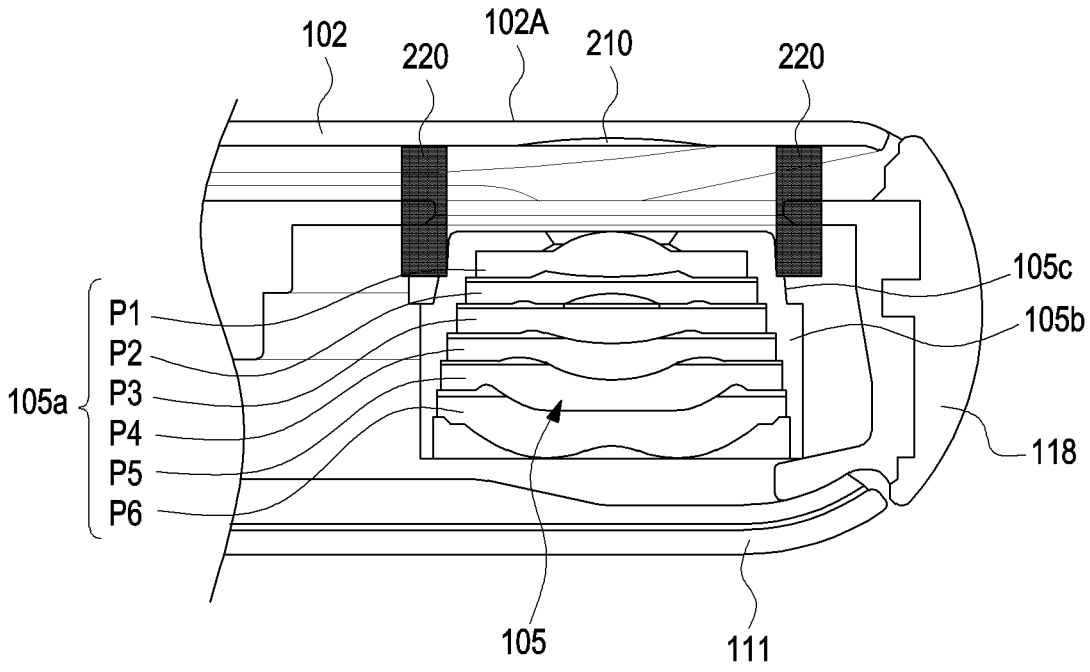
FIG. 6B is a diagram illustrating a cross-sectional view of an electronic device including a window member and an optical lens module according to various embodiments.

FIG. 6A is a diagram illustrating a cross-sectional view of an electronic device including a window member 102' and an optical lens module 105'. FIG. 6B is a diagram illustrating an electronic device 100 including a window member 102 and an optical lens module 105 according to various embodiments.

Referring to FIGS. 6A and 6B, an optical lens module 105' or 105 formed of a combination of a plurality of lenses may include a plurality of lenses to obtain a high resolution and bright images.

The embodiment shown in FIG. 6A includes an optical lens module 105' including seven lenses P1, P2, P3, P4, P5, P6, and P7 as the plurality of lenses. The embodiment shown in FIG. 6B discloses an optical lens module 105 including six lenses P1, P2, P3, P4, P5, and P6 as the plurality of lenses. According to various embodiments of the disclosure, shown through FIG. 6B, as the window member 102 is provided with the window lens area 210, it may be possible to remove one lens (e.g., P7) from the seven lenses P1, P2, P3, P4, P5, P6, and P7 of FIG. 6A. Thus, it is possible to reduce the thickness of the electronic device. Alternatively, assuming that the optical lens modules 105' and 105 have the same number of lenses, an effect of providing more lenses may be achieved by providing the window lens area 210 in the window member 102.

According to various embodiments of the disclosure, the optical lens module 105 may include a lens assembly 105a in which a plurality of lenses are aligned, optical components, or a lens housing 105b receiving the optical components therein.

In the lens assembly 105a, the plurality of lenses are aligned. For example, the plurality of lenses may include first to sixth lenses P1, P2, P3, P4, P5, and P6. According to an embodiment, the plurality of lenses may be disposed side by side and to overlap each other inside the lens barrel and may obtain images or image information through the lenses. According to various embodiments, at least one of the first to sixth lenses P1, P2, P3, P4, P5, and P6 may be formed as an aspheric lens. The aspheric lens may be a lens having an inflection point. The inflection point may refer, for example, to a point where the sign of the radius of curvature changes from (+) to (−) or from (−) to (+). The inflection point may refer, for example, to a point where the shape of at least one side of the lens changes from convex to concave or from concave to convex. The radius of curvature may refer, for example, to the degree of curvature at each point on a curve or curved surface. As at least one of the first to sixth lenses P1, P2, P3, P4, P5, and P6 is formed as an aspheric lens, the curvature of field may be prevented or reduced. According to various embodiments, the optical lens module 105 is provided with a stop to adjust the amount of light passing through the lens, thereby adjusting the brightness of an image or video information.

The lens housing 105b may provide a space in which the lens assembly 105a is seated and may fix the lens assembly 105a in a position aligned with the opening (e.g., the opening 101a of FIG. 3) of the display. According to various embodiments, an image sensor, an image signal processor, or other various optical components may be mounted inside the lens housing 105b. The image sensor is a sensor mounted on a circuit board (not shown) and disposed in alignment with the optical axis of the lens assembly 105a and may react to light. The image sensor may include a sensor such as a complementary metal-oxide semiconductor (CMOS) or charge coupled device (CCD) sensor. The image sensor, however, is not limited thereto, but may rather include various elements that convert light, e.g., an object image, into an electrical image signal. The image sensor may detect brightness, contrast ratio information, or color information about the object from the light which has been transmitted through the plurality of lenses (e.g., P1, P2, P3, P4, P5, and P6), thereby obtaining an image for the object.

According to various embodiments, the guide member 220 may form a fastening structure with the lens housing 105b. The fastening structure of the guide member 220 and the lens housing 105b is described below in detail with reference to FIGS. 7A, 7B, 7C, 7D, and 7E. Further, in the embodiments of FIGS. 7A, 7B, 7C, 7D, and 7E, various embodiments according to arrangements of the window lens area 210 on the window member 102 are disclosed.

Figure 7A:
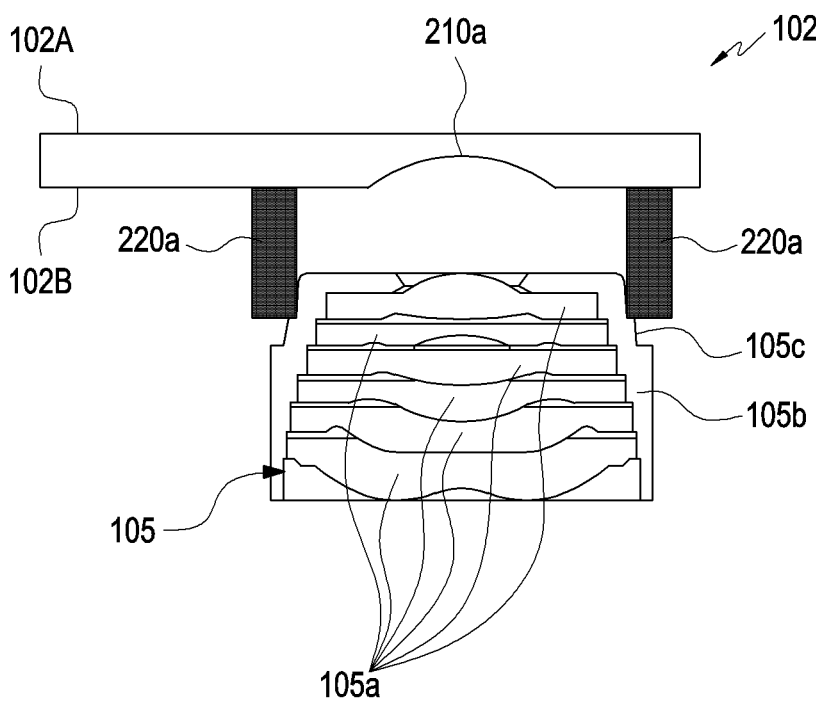
FIG. 7A is a diagram illustrating a conceptual view of an arrangement relationship between a window lens area, a guide member, and an optical lens module according to various embodiments.
Figure 7B:
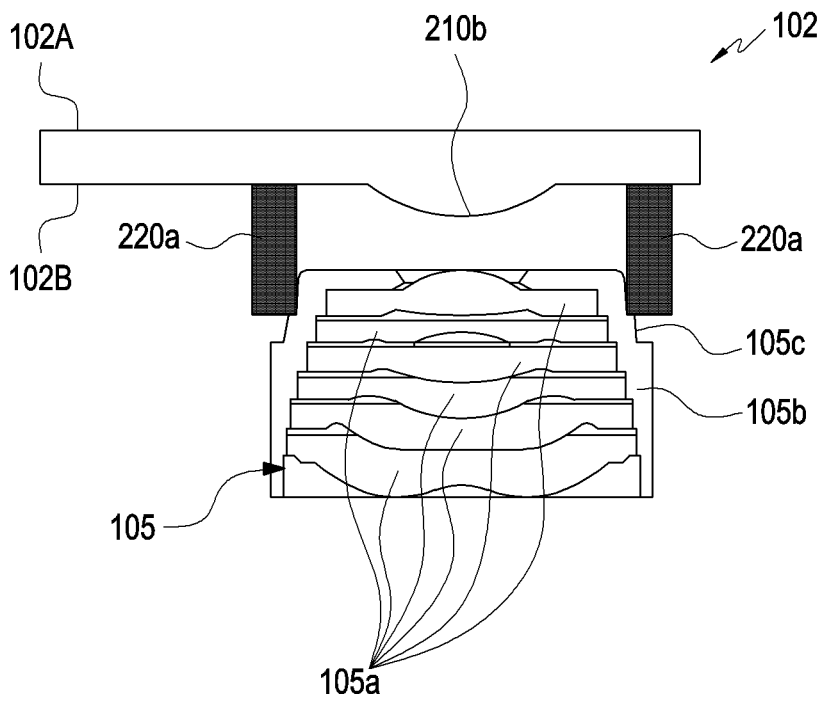
FIG. 7B is a diagram illustrating a conceptual view of an arrangement relationship between a window lens area, a guide member, and an optical lens module according to various embodiments.
Figure 7C:
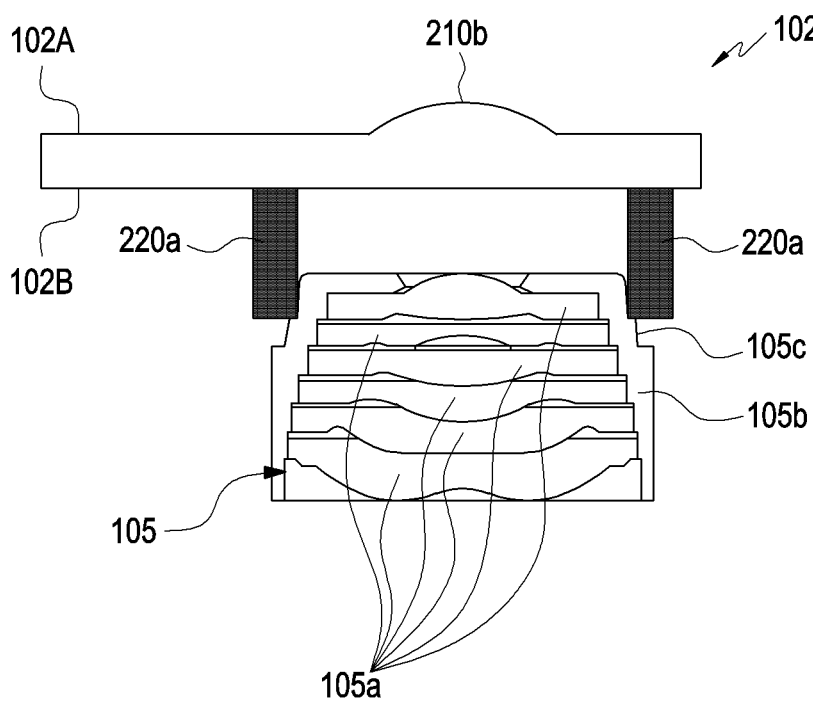
FIG. 7C is a diagram illustrating a conceptual view of an arrangement relationship between a window lens area, a guide member, and an optical lens module according to various embodiments.
Figure 7D:
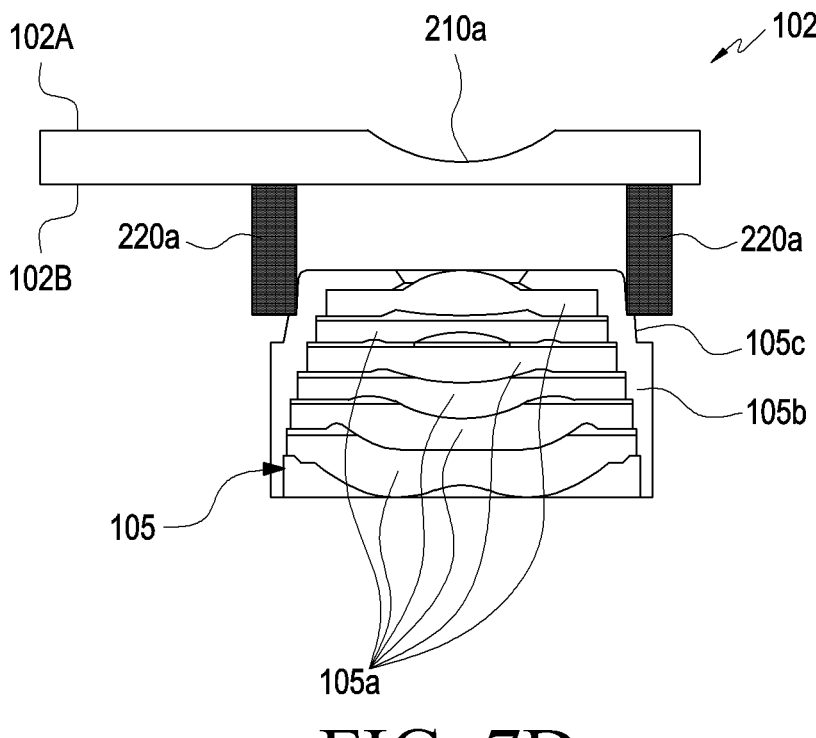
FIG. 7D is a diagram illustrating a conceptual view of an arrangement relationship between a window lens area, a guide member, and an optical lens module according to various embodiments.
Figure 7E:
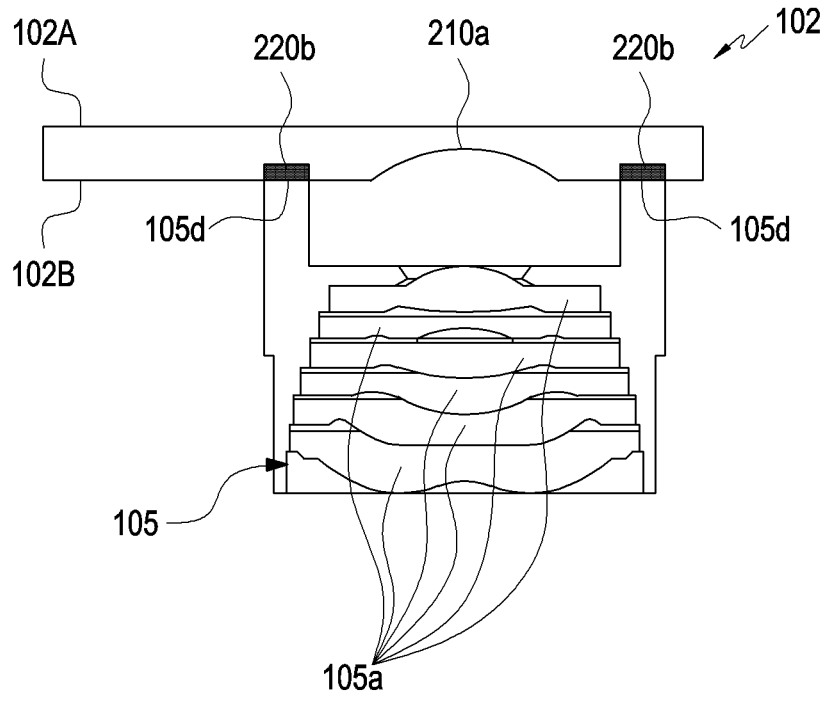
FIG. 7E is a diagram illustrating a conceptual view of an arrangement relationship between a window lens area, a guide member, and an optical lens module according to various embodiments.

FIG. 7A is a diagram illustrating a conceptual view of an arrangement relationship between a window lens area, a guide member, and an optical lens module according to various embodiments (e.g., a first embodiment). FIG. 7B is a diagram illustrating a conceptual view of an arrangement relationship between a window lens area, a guide member, and an optical lens module according to various embodiments (e.g., a second embodiment). FIG. 7C is a diagram illustrating a conceptual view of an arrangement relationship between a window lens area, a guide member, and an optical lens module according to various embodiments (e.g., a third embodiment). FIG. 7D is a diagram illustrating a conceptual view of an arrangement relationship between a window lens area, a guide member, and an optical lens module according to various embodiments (e.g., a fourth embodiment). FIG. 7E is a diagram illustrating a conceptual view of an arrangement relationship between a window lens area, a guide member, and an optical lens module according to various embodiments (e.g., a fifth embodiment).

Referring to the first embodiment of FIG. 7A, the guide member 220a may have a shape protruding from the second surface 102B of the window member 102. Correspondingly, the optical lens module 105 may have a stepped portion 105c formed on the lens housing 105b. Accordingly, the guide member 220a protruding from the window member 102 may be engaged with the stepped portion 105c of the lens housing 105b. As the guide member 220a is engaged with the stepped portion 105c of the lens housing 105b, the optical axis between the window lens area 210a of the window member 102 and the lens assembly 105a may be easily aligned.

Also, in the second embodiment, the third embodiment, and the fourth embodiment, the guide member 220a may have a shape protruding from the second surface 102B of the window member 102. Correspondingly, the optical lens module 105 may have a stepped portion 105c formed on the lens housing 105b. Accordingly, the guide member 220a protruding from the window member 102 may be engaged with the stepped portion 105c of the lens housing 105b.

In the second embodiment of FIG. 7B, the window lens area 210b formed on the window member 102 is illustrated as having a convex shape from the second surface 102B. In the third embodiment of FIG. 7C, the window lens area 210b formed on the window member 102 is illustrated as having a convex shape from the first surface 102A. In the fourth embodiment of FIG. 7D, the window lens area 210b formed on the window member 102 is illustrated as having a concave shape from the first surface 102A.

According to the fifth embodiment of FIG. 7E, the guide member 220b may have a shape of being led in to the second surface 102B of the window member 102. For example, the guide member 220b may be formed as a recess type. Correspondingly, the optical lens module 105 may have a protrusion 105d formed on the lens housing 105b. The protrusion 105d protruding from one surface of the lens housing 105b toward the window member 102 may be inserted and fitted into the guide member 220b. As the guide member 220b is engaged with the protrusion 105d of the lens housing 105b, the optical axis between the window lens area 210a of the window member 102 and the lens assembly 105a may be easily aligned. Various embodiments of the window lens area 210a described above in connection with the embodiments of FIGS. 7A, 7B, 7C, and 7D may be similarly applied to the recess-type guide member 220b of FIG. 7E.

The shapes and positions of the window lens area 210 and the guide member 220 integrally formed with the window member 102 may vary as in the above-described embodiments.

Figure 8A:
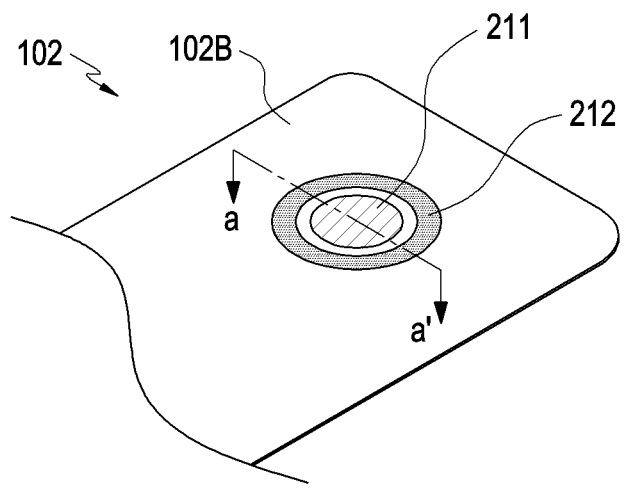
FIG. 8A is a diagram illustrating a perspective view of a window member having a composite lens area according to various embodiments.
Figure 8B:
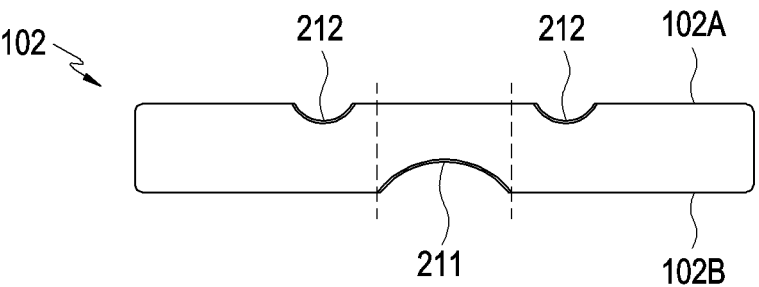
FIG. 8B is a diagram illustrating a cross-sectional view of a window member having a composite lens area according to various embodiments.
Figure 8C:
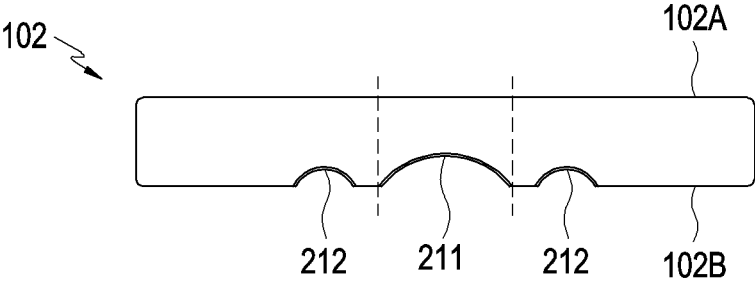
FIG. 8C is a diagram illustrating a cross-sectional view of a window member having a composite lens area according to various embodiments.

FIG. 8A is a diagram illustrating a perspective view of a window member having a composite lens area according to various embodiments. FIG. 8B is a diagram illustrating a cross-sectional view of a window member having a composite lens area according to various embodiments. FIG. 8B is a cross-section taken along line a-a' in FIG. 8A. FIG. 8C is a diagram illustrating a cross-sectional view of a window member having a composite lens area according to various embodiments.

According to various embodiments, a composite lens area may be formed in the window member 102. Here, the 'composite lens' may, for example, refer to a combination of two or more lenses formed in various positions and having various widths. According to an example embodiment, in combining and arranging the two or more lenses, the lenses may be formed not to overlap each other. Since the light passing through the window member 102 may be differently refracted depending on the position of incidence due to the angle of incidence of light, the refractive index of the medium (window member 102), and/or the roughness of the incident surface, the optical function may be enhanced by forming a composite lens area.

Referring to FIG. 8A, a composite lens area formed on the window member 102 may include a first lens area 211 and a second lens area 212 around the first lens area 211 that does not overlap the first lens area 211.

Referring to FIGS. 8A and 8B together, the second lens area 212 may be formed to surround the first lens area 211. The center of the first lens area 211 may be positioned inside the second lens area 212, and the second lens area 212 and the first lens area 211 may form concentric circles.

According to an embodiment, the first lens area 211 and the second lens area 212 may be formed on different surfaces of the window member 102. For example, referring to FIGS. 8A and 8B together, the first lens area 211 and the second lens area 212 may be respectively formed on the first surface 102A and the second surface 102B of the window member 102.

According to an embodiment, the first lens area 211 and the second lens area 212 may be formed on the same surface of the window member 102. For example, referring to FIG. 8C, the first lens area 211 may be formed on the second surface 102B of the window member 102, and the second lens area 212 may also be formed on the second surface 102B of the window member 102.

Embodiments of the composite lens area are not limited to the above-described embodiments. The first lens area 211 may be formed on the first surface 102A or the second surface 102B of the window member 102, and the second lens area 212 may be formed on a surface of the window member 102 on which the first lens area 211 is not formed. For example, although not shown in the drawings, the first lens area 211 may be formed on the first surface 102A of the window member 102, and the second lens area 212 may be formed on the second surface 102B of the window member 102. Other various embodiments are possible.

According to various embodiments of the disclosure, as an embodiment for enhancing the optical function, the window member 102 may be formed using two or more materials having different refractive indexes. According to an embodiment, it is possible to enhance performance of optical module with respect to scratches by forming one window member 102 using a general glass material and sapphire glass having a relatively superior hardness value. For example, as shown in FIG. 7A or 7D, when the window lens area 210 has a concave lens shape 210a formed of a general glass material, the thickness of the corresponding window lens area 210 is thinner than the other portions. Thus, it is possible to maintain the strength of the glass by including sapphire glass in the concave portion.

Figures 9A, 9B:
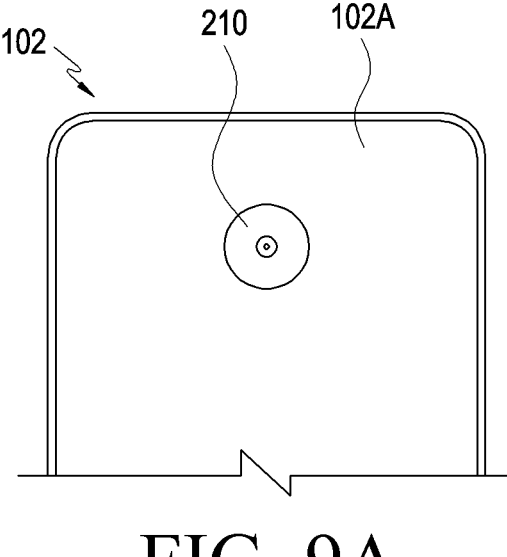
FIG. 9A is a diagram illustrating a front view of a window member having a lens area on a first surface according to various embodiments.
FIG. 9B is a diagram illustrating a perspective view of a window member having a lens area on a first surface according to various embodiments.
Figure 9C:
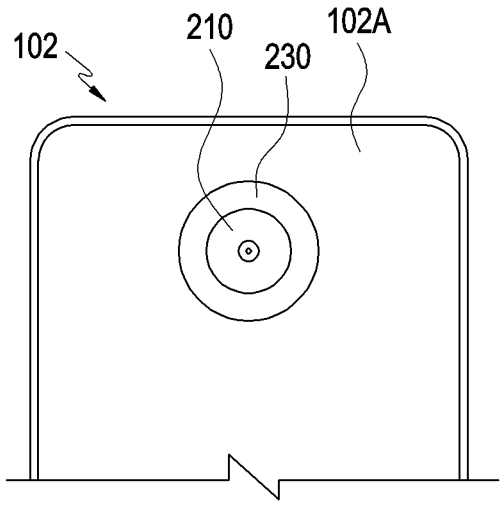
FIG. 9C is a diagram illustrating a front view of a window member having a lens area and a guide portion for accessory assembly on a first surface according to various embodiments.
Figure 9D:
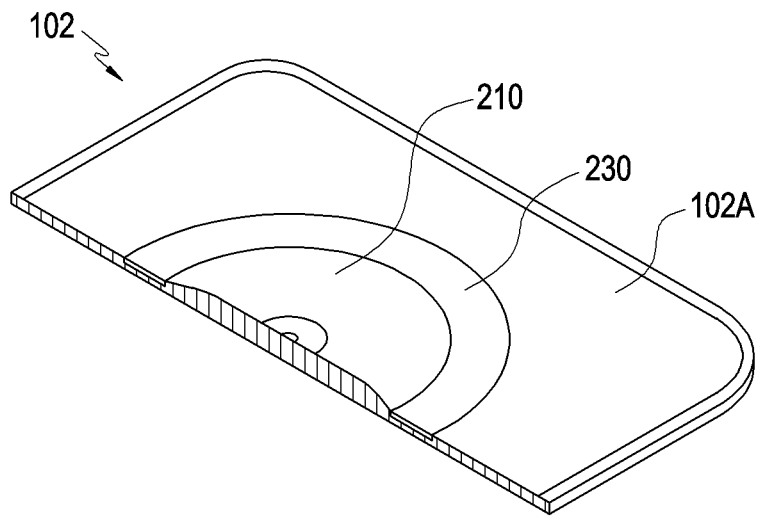
FIG. 9D is a diagram illustrating a perspective view of a window member having a lens area and a guide portion for accessory assembly on a first surface according to various embodiments.
Figure 9E:
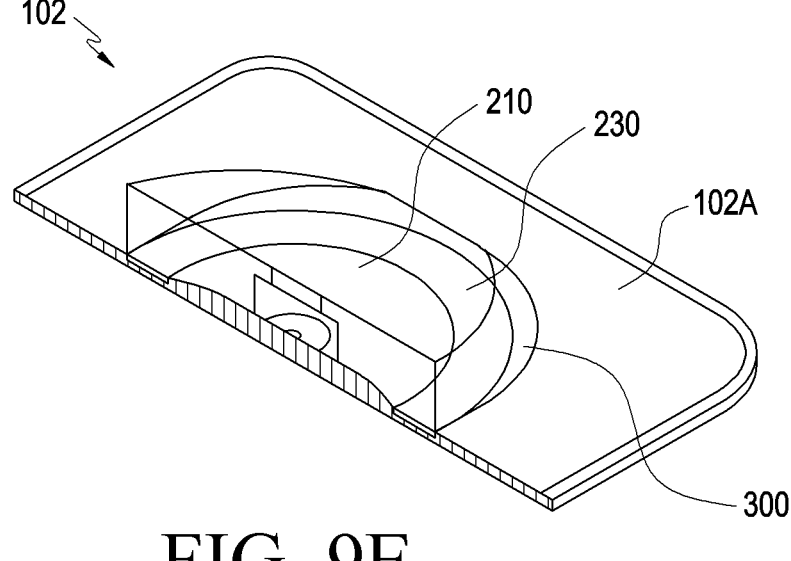
FIG. 9E is a diagram illustrating a perspective view of an accessory-attached window member according to various embodiments.

FIG. 9A is a diagram illustrating a front view of a window member 102 having a window lens area 210 on a first surface 102A according to various embodiments. FIG. 9B is a diagram illustrating a perspective view of a window member 102 having a window lens area 210 on a first surface 102A according to various embodiments. FIG. 9C is a diagram illustrating a front view of a window member 102 having a window lens area 210 and a guide portion 230 for accessory assembly on a first surface 102A according to various embodiments. FIG. 9D is a diagram illustrating a perspective view of a window member 102 having a window lens area 210 and a guide portion 230 for accessory assembly on a first surface 102A according to various embodiments. FIG. 9E is a diagram illustrating a perspective view of an accessory 300-attached window member 102 according to various embodiments.

Referring to FIGS. 9A and 9B together, a window lens area 210 may be formed on the first surface 102A of the window member 102. Here, the window lens area 210 is disclosed as having a convex shape from the first surface 102A but, in contrast, may have a concave shape on the first surface 102A.

According to various embodiments, as shown in FIGS. 9C and 9D, the window member 102 may further include a guide portion 230 for accessory assembly on the first surface 102A. According to an embodiment, the guide portion 230 for accessory assembly may be formed around the window lens area 210 and may have a shape stepped from the window lens area 210 and/or the portions of the window member 102 other than the window lens area 210.

Referring to FIG. 9E, an accessory 300 may be mounted on the guide portion 230 for accessory assembly, so that it is possible to enhance the optical function using the optical lens module 105 in the electronic device 100. The accessory 300 may correspond to an interchangeable lens, a camera deco, a stop, or various camera modules.

Figure 10A:
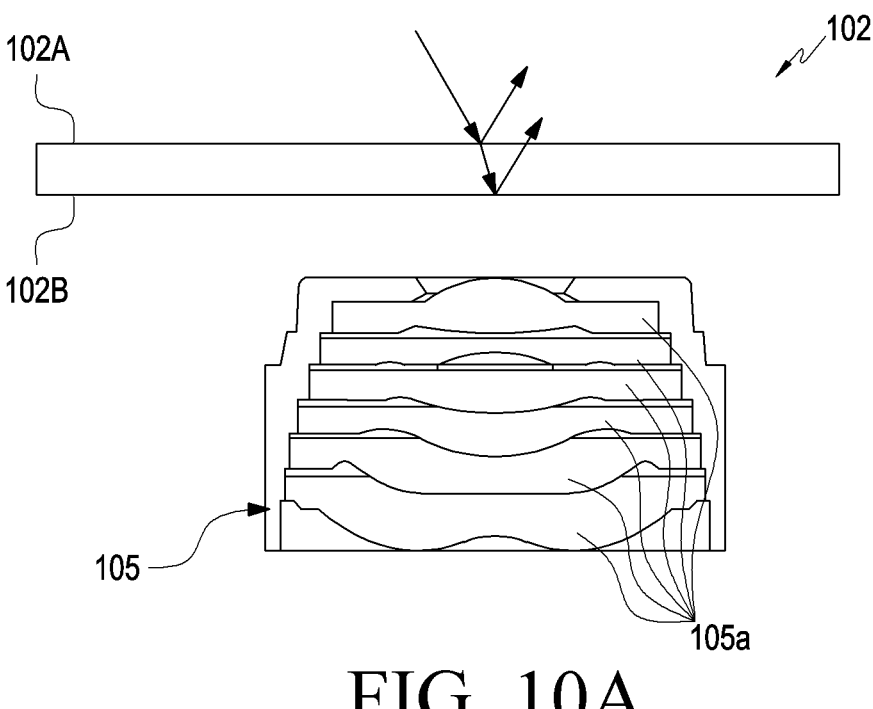
FIG. 10A is a diagram illustrating a view of a state in which light is transmitted and reflected by a window member.
Figure 10B:
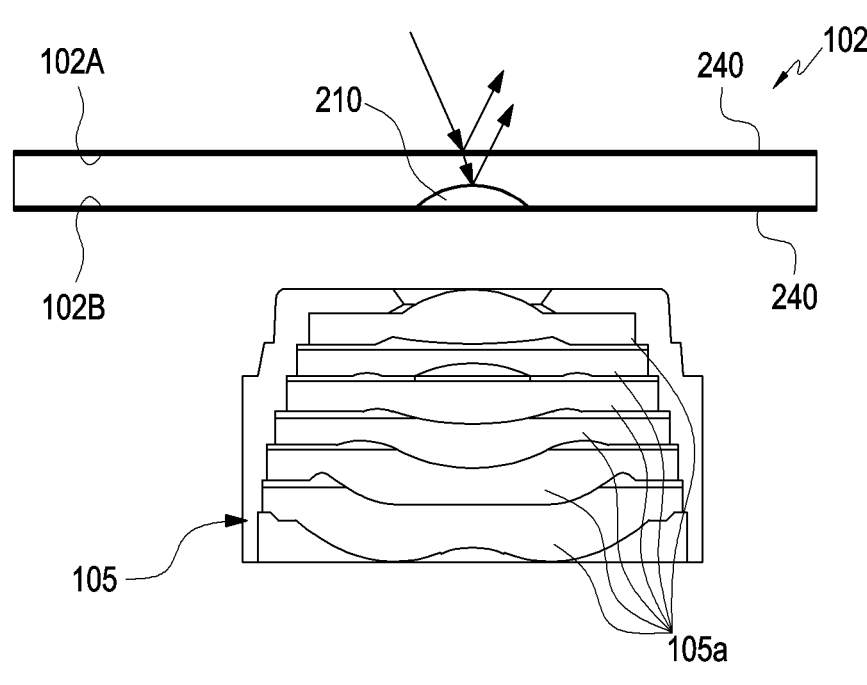
FIG. 10B is a diagram illustrating a view of a state in which light is transmitted and reflected by a window member according to various embodiments.

FIG. 10A is a diagram illustrating a view of a state in which light is transmitted and reflected by a window member. FIG. 10B is a diagram illustrating a view of a state in which light is transmitted and reflected by a window member according to various embodiments.

According to various embodiments, the window member 102 may have an anti-reflection coating layer 240 formed on at least one of the first surface 102A or the second surface 102B. For example, as shown in FIG. 10B, the anti-reflection coating layer 240 may be formed on each of the first surface 102A and second surface 102B of the window member 102.

Light may be reflected due to the refractive index of the medium (e.g., the window member 102 including glass), causing light loss. Thus, the transmittance of light incident on the lens assembly 105a may be decreased. For example, as shown in FIG. 10A, 4.2% of the light incident on the first surface 102A of the window member 102 may be reflected by the surface, and 4.02% of the light transmitted through the first surface 102A and reaching the second surface 102B may be reflected, causing a light loss of 8.22% in total. Light loss may be further increased when the window lens area 210 is formed on the first surface 102A or second surface 102B of the window member 102.

Thus, according to various embodiments of the disclosure, it is possible to minimize light loss by forming the anti-reflection coating layer 240 on at least one of the first surface 102A or the second surface 102B. For example, as shown in FIG. 10B, 0.5% of light incident on the first surface 102A of the window member 102, where the anti-reflection coating layer 240 is formed, may be reflected by the surface, and 0.498% of light transmitted through the first surface 102A and reaching the second surface 102B, where the anti-reflection coating layer 240 is formed, may be reflected, causing a light loss of 0.998% in total. As compared to the above-described FIG. 10A, a significant light loss reduction effect may be exhibited.

According to the above-described embodiments, the window member 102 may be formed by an ultra-high temperature thermoforming process (e.g., glass melt forming). In this case, the window lens area 210 and the guide member 220 may be integrally formed in one process when forming the window member 102. An example of the ultra-high temperature thermoforming process is as follows. First, a mold set may be put into an ultra-high-temperature facility, such as a chamber or furnace heated above the melting point. If the base material (e.g., glass) of the window member 102 is inserted into the mold set, the base material of the window member 102 molten after a predetermined time may fill the internal shape of the mold set and be thus implemented into a design product shape corresponding to the design of the mold set. Thereafter, the window member 102 having a desired shape may be obtained by separating the glass from the mold set after passing through an annealing and cooling process. If the mold set has a concave-convex structure corresponding to the window lens area 210 and the guide member 220, the window lens area 210 and the guide member 230 integrally formed in one process when forming the window member 102 may be obtained.

According to the above-described embodiments, an electronic device with an elegant and aesthetically-pleasing exterior may be provided by preventing (or reducing) the optical lens module from exposure to the outside of the electronic device, while securing a lens performance of the optical lens module by forming the lens in the window member. According to various embodiments of the disclosure, misalignment (decenter) between the window lens and the optical lens module may be prevented or reduced by adding a guide member to the window member. Since the lens and the guide member may be integrally formed during the process of forming the window member, the above effects may be enjoyed without an increase in manufacturing cost.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device (e.g., the electronic device 100 of FIG. 1) may include a window (e.g., the window member 102 of FIG. 1) including a first surface (e.g., the first surface 110A of FIG. 1) and a second surface (e.g., the second surface 110B of FIG. 1) facing in a direction opposite to the first surface and an optical lens module (e.g., the optical lens module 105 of FIG. 3) including a lens housing disposed in an internal space of the electronic device and a lens assembly aligned to the second surface of the window in the lens housing, wherein the window includes a window lens area (e.g., the window lens area 210 of FIG. 4) formed in a position corresponding to the lens assembly in the first surface or the second surface and an alignment guide (e.g., the guide member 220 of FIG. 4) formed around the window lens to align the window lens area and the lens assembly.

According to various example embodiments, the window lens area may include a concave lens area concave from the first surface or the second surface or a convex lens area convex from the first surface or the second surface.

According to various example embodiments, the electronic device may further comprise a display panel (e.g., the display panel 101 of FIG. 3) stacked with the window.

According to various example embodiments, the display panel may include an opening (e.g., the opening 101a of FIG. 3) aligned with the window lens area and the lens assembly.

According to various example embodiments, the alignment guide, together with the lens housing, may form a fastening structure.

According to various example embodiments, the alignment guide may have a shape protruding from the second surface of the window.

According to various example embodiments, the alignment guide may have a shape engaged with a stepped portion (e.g., the stepped portion 105c of FIG. 6B) of the lens housing (e.g., the lens housing 105b of FIG. 6B).

According to various example embodiments, the alignment guide may have a shape concavely led in (extending) to an inside from the second surface of the window member.

According to various example embodiments, at least a portion of a protrusion (e.g., the protrusion 105d of FIG. 7E) of the lens housing may be fitted into the alignment guide.

According to various example embodiments, the lens may include a first lens area (e.g., the first lens area 211 of FIG. 8A) and a second lens area (e.g., the second lens area 212 of FIG. 8A) formed around the first lens area to not overlap the first lens area.

According to various example embodiments, the first lens area and the second lens area may be formed on the first surface or the second surface of the window.

According to various example embodiments, the first lens may be formed on the first surface or the second surface of the window, and the second lens area may be formed on a surface of the window, where the first lens area is not formed.

According to various example embodiments, the window may have an anti-reflection coating layer (e.g., the anti-reflection coating layer 240 of FIG. 10A) formed on at least one of the first surface or the second surface.

According to various example embodiments, the window lens area may be formed in the first surface of the window, and an accessory assembly guide for accessory assembly (e.g., the guide portion 230 for accessory assembly of FIG. 9C) may be formed around the window lens area.

According to various example embodiments, the window lens area and the alignment guide may be simultaneously formed by an ultra-high-temperature thermoforming process when forming the window.

According to various example embodiments of the disclosure, an electronic device may include a window including a first surface forming a front surface of the electronic device and a second surface facing in a direction opposite to the first surface, a display panel stacked with the window, and an optical lens module including a lens housing disposed in an internal space of the electronic device and a lens assembly aligned to the second surface of the window member in the lens housing, wherein the window includes a window lens area formed on the first surface or the second surface and an alignment guide formed around the window lens to align the window lens area and the lens assembly, and wherein the window lens area and the alignment guide are integrally formed with the window.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a window including a first surface forming a front surface of the electronic device and a second surface facing in a direction opposite to the first surface;
a display panel viewable through at least a portion of the window; and
an optical lens module including a lens housing disposed in an internal space of the electronic device and a lens assembly,
wherein the window includes a window lens area formed on the first surface or the second surface and an alignment guide formed around the window lens area for aligning an optical axis of the window lens area and an optical axis of the lens assembly, and
wherein the window lens area and the alignment guide are integrally formed with the window to be of a same material.

2. The electronic device of claim 1, wherein the window lens area includes a concave lens area concave from the first surface or the second surface or a convex lens area convex from the first surface or the second surface.

3. The electronic device of claim 1, wherein the alignment guide, together with the lens housing, forms a fastening structure.

4. The electronic device of claim 3, wherein the alignment guide has a shape protruding from the second surface of the window.

5. The electronic device of claim 4, wherein the alignment guide has a shape engaged with a stepped portion of the lens housing.

6. The electronic device of claim 3, wherein the alignment guide has a shape concavely extending to an inside from the second surface of the window, and
wherein at least a portion of a protrusion of the lens housing is fitted into the alignment guide.

7. The electronic device of claim 1, wherein the window lens area includes a first lens area and a second lens area formed around the first lens area to not overlap the first lens area.

8. The electronic device of claim 7, wherein the first lens area and the second lens area are formed on the first surface or the second surface of the window.

9. The electronic device of claim 7, wherein the first lens area is formed on the first surface or the second surface of the window, and the second lens area is formed on a surface of the window, where the first lens area is not formed.

10. The electronic device of claim 1, wherein the window has an anti-reflection coating layer formed on at least one of the first surface or the second surface.

11. The electronic device of claim 1, wherein the window lens area is formed in the first surface of the window, and wherein an accessory assembly guide for an accessory assembly is formed around the window lens area.

12. The electronic device of claim 1, wherein the window lens area and the alignment guide are simultaneously formed by an ultra-high-temperature thermoforming process when forming the window.

13. An electronic device, comprising:
a window including a first surface forming a front surface of the electronic device and a second surface facing in a direction opposite to the first surface;
a display panel viewable through at least a portion of the window; and
an optical lens module including a lens housing disposed in an internal space of the electronic device and a lens assembly,
wherein the window includes a window lens area formed on the first surface or the second surface and an alignment guide formed around the window lens area for aligning an optical axis of the window lens area and an optical axis the lens assembly,
wherein the display panel includes an opening therethrough which overlaps the optical axes of the window lens area and the lens assembly, and
wherein the window lens area and the alignment guide are formed of a same material as the window.

* * * * *